United States Patent
Del Angel et al.

(10) Patent No.: US 11,780,785 B2
(45) Date of Patent: Oct. 10, 2023

(54) CERAMIC COATINGS WITH APATITE CARBONATE THAT ALLOW A TACTILE THERMAL SENSATION SIMILAR TO WOOD AND GOOD RESISTANCE AGAINST WEAR, CHEMICAL ATTACK AND STAINING

(71) Applicant: PORCELANITE LAMOSA, S.A. DE C.V., Nuevo León (MX)

(72) Inventors: Jorge Abraham Daniel Del Angel, Nuevo León (MX); Luis Alberto Basurto Morales, Nuevo León (MX); Luis Eduardo Valdés Gámez, Nuevo León (MX); Antonio Fernández Fuentes, Nuevo León (MX); Gregorio Vargas Gutiérrez, Nuevo León (MX)

( * ) Notice: Subject to any disclaimer, the term of this patent is extended or adjusted under 35 U.S.C. 154(b) by 315 days.

(21) Appl. No.: 16/324,563

(22) PCT Filed: Mar. 24, 2017

(86) PCT No.: PCT/MX2017/000038
§ 371 (c)(1),
(2) Date: Jun. 3, 2019

(87) PCT Pub. No.: WO2018/030885
PCT Pub. Date: Feb. 15, 2018

(65) Prior Publication Data
US 2021/0230078 A1    Jul. 29, 2021

(30) Foreign Application Priority Data
Aug. 10, 2016    (MX) .................. MX/a/2016/010346

(51) Int. Cl.
| | |
|---|---|
| *C04B 41/86* | (2006.01) |
| *C04B 14/26* | (2006.01) |
| *C04B 41/50* | (2006.01) |
| *C04B 33/34* | (2006.01) |
| *C04B 41/52* | (2006.01) |
| *C04B 41/89* | (2006.01) |
| *C04B 33/00* | (2006.01) |

(52) U.S. Cl.
CPC .............. *C04B 41/86* (2013.01); *C04B 14/26* (2013.01); *C04B 33/00* (2013.01); *C04B 41/501* (2013.01); *C04B 41/504* (2013.01); *C04B 41/5015* (2013.01); *C04B 41/52* (2013.01); *C04B 41/89* (2013.01); *C04B 2235/9669* (2013.01); *Y10T 428/31504* (2015.04); *Y10T 428/8305* (2015.04)

(58) Field of Classification Search
CPC ... C04B 41/85; C04B 41/501; C04B 41/5015; C04B 41/52; C04B 41/89
See application file for complete search history.

(56) References Cited

U.S. PATENT DOCUMENTS

| | | | | |
|---|---|---|---|---|
| 3,689,611 | A | * 9/1972 | Hardy | .................. C04B 41/4578 |
| | | | | 264/602 |
| 5,807,641 | A | * 9/1998 | Oku | .......................... C03C 8/18 |
| | | | | 428/428 |
| 5,981,425 | A | * 11/1999 | Taoda | .................... B01J 35/002 |
| | | | | 502/238 |
| 6,013,591 | A | 1/2000 | Ying et al. | |
| 2003/0228967 | A1* | 12/2003 | Bitossi | .................... C04B 41/86 |
| | | | | 501/16 |
| 2013/0017388 | A1* | 1/2013 | Boguslavsky | ............ C03C 8/14 |
| | | | | 428/312.6 |

FOREIGN PATENT DOCUMENTS

| | | | |
|---|---|---|---|
| EP | 625490 A1 | * 11/1994 | ............. A61L 27/12 |
| EP | 0625490 A1 | 11/1994 | |
| WO | 2005005680 A2 | 1/2005 | |
| WO | 2006125840 A1 | 11/2006 | |
| WO | 2008122677 A1 | 10/2008 | |
| WO | 2010132452 A3 | 11/2010 | |
| WO | 2012118458 A1 | 9/2012 | |
| WO | 2013095308 A1 | 6/2013 | |
| WO | 2016155909 A1 | 10/2016 | |

OTHER PUBLICATIONS

Supalukmeta et al., "Formulation of High Reflection Engobe and Their Industrial Uses for Earthenware Wall Tile" TNI Journal of Engineering and Technology, vol. 2, No. 2 Jul.-Dec. 2014 (Year: 2014).*
ISR; Office of Patents; Madrid Spain; Sep. 11, 2017.
Supalukmeta P et al: "Formulation of High Reflection Engobe and Their Industrial Uses for Earthenware Wall Tile;" Jan. 1, 2014.
Effects of magnesium oxychloride and silicon carbide additives on the foaming property during firing for porcelain ceramics and their microstructure, Xi, X .; Shui, A .; Li, Y .; Wang, Y .; Abe, H .; Naito, M., Journal of the European Ceramic Society, vol. 32, Issue: 12, pp. 3035-3041.

(Continued)

*Primary Examiner* — Alex B Efta
(74) *Attorney, Agent, or Firm* — Patshegen IP; Moshe Pinchas

(57) ABSTRACT

In one aspect, the present invention comprises providing an additive or aggregate to be applied directly to one or more of the components of a ceramic coating and which is constituted by carbonate apatites particles which are maintained as aggregates within a matrix of silicoaluminates at firing temperatures of the ceramic coatings, where the main function of these aggregates is to provide the ceramic coating properties selected from the group comprising: low effusivity, wear resistance, resistance to chemical attack and resistance to staining. In other aspects, the present invention comprises providing a ceramic coating incorporating said additive and a method for providing a ceramic coating with properties selected from the group comprising: low effusivity, wear resistance, resistance to chemical attack and resistance to staining.

1 Claim, No Drawings

(56) References Cited

OTHER PUBLICATIONS

Microstructural characterization of ceramic floor tiles with the incorporation of wastes from ceramic tile industries, Effting, C .; Folgueras, M.V .; Guths, S .; Alarcon, O.E., Materials Research, vol. 13, Issue: 3, pp. 319-323.

Thermal conductivity studies on ceramic floor tiles, Garcia, E .; from Pablos, A .; Bengoechea, M. A .; Guaita, L .; Osendi, M. I .; Miranzo, P., Ceramics International, vol. 37, Issue: 1, pp. 369-375.

Evaluation of the thermal comfort of ceramic floor tiles, Effting, C .; Guths, S .; Alarcon, O.E., Materials Research, vol. 10, Issue: 3, pp. 301-307.

Preparation and properties of ceramic tiles for heat insulation, Sun, C.-C .; Hu, Z.-J .; Li, T.-Q .; Zhang, H.-B .; Sun, Z.-J .; Zhang, Z.-G., Materials Science Forum, vol. 546-549, Issue: Pt. 4.

\* cited by examiner

CERAMIC COATINGS WITH APATITE CARBONATE THAT ALLOW A TACTILE THERMAL SENSATION SIMILAR TO WOOD AND GOOD RESISTANCE AGAINST WEAR, CHEMICAL ATTACK AND STAINING

OBJECT OF THE INVENTION

The object of the present invention is to obtain ceramic coatings or coatings with a thermal sensation to the touch similar to that of wood and which also have good resistance to wear, chemical attack and staining.

Ceramic coatings or coatings are products such as tiles, mosaics, trimmings, porcelain or similar products used in the construction industry to cover surfaces such as floors, walls, roofs and facades.

BACKGROUND OF THE INVENTION

It is important to mention that even when persons can feel a generally pleasant thermal sensation of their surroundings, they can have parts of their body in conditions of thermal discomfort; thus, for example, the inadequate temperature of a tile can produce thermal discomfort if one walks barefoot due to the loss of body heat through the feet. This sensation of localized discomfort cannot be avoided by increasing or decreasing the average temperature of the room, but it is necessary to neutralize its cause.

Based on the results of several studies carried out on thermal comfort, the ASHRAE (American Society of Heating, Air Conditioning and Refrigeration Engineers) has established a recommended temperature range for floors between 19 and 29° C. (*Developing an Adaptive Model of Thermal Comfort and Preference*, R. de Dear, G. Brager, D. Cooper, Final Report ASHRAE RP-884, 1997); a temperature of 24° C. will produce the largest number of satisfied individuals and the least dissatisfied. The ASHRAE establishes other recommendable temperature ranges for those areas in which an individual is more likely to walk barefoot, such as the areas surrounding swimming pools, gymnasiums, bedrooms, changing rooms, bathrooms, etc., or even preschool-level schools where young children, usually play directly on the floor.

The upper limit of the optimal range of temperatures is essentially determined by the average temperature of the skin that is approximately 29° C. with a pain threshold set at 45° C. The percentage of individuals that show dissatisfaction for a given deviation from the optimal temperature range depends on the material with which the floor is constructed. Thus, and for a 10-minute exposure at a floor temperature of 20° C., the percentage of unsatisfied persons on a concrete floor was 84% while on a wooden floor it decreased to 25%. A concrete temperature of 24° C. will produce, after 10 minutes of exposure, the same percentage of unsatisfied persons (approximately 35%) as a wooden floor at 18° C.

The thermal effusivity (known in the international literature as "thermal effusivity", "thermal addmittance", "heat penetration coefficient" or "thermal inertia") is the magnitude that defines the temperature in the area of contact between two bodies. The thermal effusivity is therefore a measure of how quickly a body can absorb energy from another. Mathematically it is defined as the square root of the product of thermal conductivity ($\kappa$), density ($\rho$) and heat capacity (Cp):

$$e = \sqrt{\kappa \cdot \rho \cdot C_p}$$

The units in which it is normally reported are $J \cdot s^{-1/2} \cdot K^{-1} \cdot m^{-2}$ (J=Joules; s=time in seconds; K=temperature in degrees Kelvin; m=meter) or $W \cdot s^{1/2} \cdot K^{-1} \cdot m^{-2}$. W=Watts; 1 W=1 $J \cdot s^{-1}$). This magnitude has great relevance for the study of cooling processes or surface heating. Although it seems an abstract magnitude, we are all familiar to a greater or lesser extent with its meaning. The thermal effusivity of our skin and of the objects that surround us determine the sensation of cold or heat that we can feel when touching them. If we touch with the palm of our hand ($\approx 37°$ C.) two bodies that are at the same temperature ($\approx 20°$ C.) but have different effusiveness, for example, a metal piece and a piece of wood, we will initially feel that one of them (the metal piece) is colder than the piece of wood. Effusiveness is precisely responsible for this sensation. Metals have a high effusiveness and absorb heat from our body more quickly than wood; that is, our hand reaches the temperature of $\approx 20°$ C. in less time in the first case. However, if we let a sufficiently long contact time pass, we will feel that both pieces are at the same temperature. Some of the factors that influence the thermal effusivity of a solid are the shape and size of the particles (morphology), their density, moisture content, degree of crystallinity, etc.

Non-metallic materials (ceramics and glass) are generally considered as thermal insulators since they do not contain free electrons and the heat is only conducted by vibrations of the crystal lattice (phonons). Most ceramics have a thermal conductivity at room temperature of between 2 and 50 $W \cdot K^{-1} \cdot m^{-1}$ (W=Watts; K=temperature in degrees Kelvin; m=meter) while glass and other amorphous substances present even lower conductivities. The porosity has a great influence on the conductivity since it generally decreases the increase in the volume fraction of pores. The effusivity directly related to the conductivity and the density of the ceramic material so that the lower the two, the less effusivity it will be.

Although there are abundant works in the literature on the processing, use of alternative raw materials and on new trends in the manufacture of ceramic coatings, there are very few works that address their thermal properties. Furthermore, most of the latter, focus on the study of mechanical properties. When carrying out the analysis of the previous art on thermal properties of ceramic tiles, the documents described below were found:

Production of ceramic or porcelain tiles feeling warm when touched using magnesium-containing additives, Oezdemir, H.; Bayrak, V.; Baltyci, Y.; Kuskay, B.; Yilmaz, M. Assignee: Vitra Karo San. go Tic. A. S., Turkey. Patent of Sep. 7, 2012, WO 2012/118458, A1. The authors of this patent use magnesium salts (oxychloride and clays with high content of this element) to decrease the thermal conductivity of the ceramic body of a tile and obtain adequate values of water absorption.

Composite tile preventing heat loss and rendering a warm feeling when touched and manufacturing method thereof, Oezdemir, H.; Bayrak, V.; Kuskay, B. Assignee: Vitra Karo San. go Tic. A. S., Turkey. Patent of Jun. 27, 2013, WO 2013/095308, A1. This patent disclose a process consisting of applying a coating to the ceramic tiles with the characteristics of being thermal insulation, either on the top, bottom or both. The coating is applied after the manufacture of the tile and according to the authors, it consists of a material (organic or inorganic) having a low thermal conductivity and high porosity and a binder.

*Effects of magnesium oxychloride and silicon carbide additives on the foaming property during firing for porcelain*

*ceramics and their microstructure*, Xi, X.; Shui, A.; Li, Y.; Wang, Y.; Abe, H.; Naito, M., Journal of the European Ceramic Society, Volume: 32, Issue: 12, Pages: 3035-3041. In this work it is investigated the use of magnesium oxychloride and CSi as additives to increase the porosity in the manufacture of porcelain in order to decrease its thermal conductivity. The combined action of the two additives has an effect greater than that of any of them individually.

*Microstructural characterization of ceramic floor tiles with the incorporation of wastes from ceramic tile industries*, Effting, C.; Folgueras, M. V.; Guths, S.; Alarcon, O. E., Materials Research, Volume: 13, Issue: 3, Pages: 319-323. This study analyzes the effect of modifying the microstructure of a tile on its thermal properties; apparently, by increasing the roughness of the surface of the tile and its porosity, it is possible to reduce its thermal conductivity and make it more pleasant to contact in the absence of footwear. In this study, waste material from the ceramic industry itself is used to manufacture the tile and, a battery of analysis techniques is used, including electron microscopy, thermal analysis and porosimetry to characterize it.

*Thermal conductivity studies on ceramic floor tiles*, Garcia, E.; from Pablos, A.; Bengoechea, M. A.; Guaita, L.; Osendi, M. I.; Miranzo, P., Ceramics International, Volume: 37, Issue: 1, Pages: 369-375. In this work, the thermal properties of ceramic tiles manufactured with different materials for use as a radiant floor are evaluated. The natural red mud and the granite are the materials that show the highest thermal conductivity while a white ceramic shows the lowest. The addition of up to 20% by weight of alumina to the natural mud further increases the conductivity and up to 50% the thermal diffusivity of the tile, making it attractive for use as a radiant floor.

*Manufacture of ceramic tile systems with phase-change material layers for enhanced thermal insulation*, King, W. A. Assignee: Mohawk Carpet Corporation, USA. Nov. 18, 2010, WO 2010132452, A2. In this invention, the material with phase change (phase-change material, PCM) is not part of the tile itself, but can be positioned at different points of the same or on the firm in which it is to be placed and be in "thermal communication" with it to increase its heat capacity ($C_p$). The patent suggests as possible locations for the PCM (either solid or liquid) a cavity of the back face of the tile, directly on the back face, partially or completely embedded in the firm on which the tile is placed, etc.

*Evaluation of the thermal comfort of ceramic floor tiles*, Effting, C.; Guths, S.; Alarcon, O. E., Materials Research, Volume: 10, Issue: 3, Pages: 301-307. This work evaluates the influence of the microstructure on the thermal effusivity of ceramic tiles. According to the authors and by the addition of refractory materials, controlled porosity and surface roughness, the unpleasant cold sensation of the surface of the tiles is mitigated.

*Preparation and properties of ceramic tiles for heat insulation*, Sun, C.-C.; Hu, Z.-J.; Li, T.-Q.; Zhang, H.-B.; Sun, Z.-J.; Zhang, Z.-G., Materials Science Forum, Volume: 546-549, Issue: Pt. 4, Progress in Light Metals, Aerospace Materials and Superconductors, Pages: 2157-2162. This paper studies the effect of the incorporation of two types of fibers in the thermal conductivity of ceramic tiles for use as thermal protection: airgel reinforced with ceramic fibers and with finely ground ceramic tiles.

Heat-accumulating tile, Garcia Santos, A.; Neila Gonzalez, J.; Caamano Martin, E.; Egido Aguilera, M. A.; Jimenez Leube, J.; Magdalena Layos, L.; Bedoya Frutos, C.; Gomez Osuna, J. M., Assignee: Polytechnic University of Madrid, Spain. Patent of Nov. 30, 2006, WO 2006/125840, A1. This patent protects an invention that consists of a tile that contains a substance that changes state (liquid or solid) as a function of temperature (phase change materials). When this substance changes from solid to liquid, the tile accumulates heat, whereas when it changes from liquid to solid, the effect is the opposite.

Thermal protective coating, Simmons, J. A.; Evans, T. G.; Churchward, R. A.; Dillard, J. G.; Olver, J. W., Assignee: Holroyd, M. J., Wessex Incorporated. Patent of Apr. 30, 2004, WO 2005/005680, A2. This invention refers to a ceramic coating for metal substrates with the characteristics of being a thermal insulator and consisting of an inorganic adhesive (alkali or alkaline earth metal silicates), a filler of certain ceramic oxides ($SiO_2$, $Al_2O_3$, $TiO_2$, CaO, etc.) and a material with high emissivity (metal oxides, CB4, etc.).

Material with enhanced thermal properties, Priegel, Jack C. Assignee: Twist Engine, Inc., USA. Patent of Feb. 14, 2008, US 20080039552, A1.

This patent application discloses a material composed of a binder (20 to <60%) and another element of low density (40-80%) that includes 70-80% of microspheres (average diameter of 4 to 100 microns). The binder can be an epoxy resin, cement or polyurethane and according to the author, the material is comfortable to the touch even after direct exposure to sunlight.

From the analysis of these documents it is inferred that most of the documents refer to applications that seek to improve the thermal insulation of the tiles for protection or their thermal conductivity for applications in radiant floors.

For the purpose of improving the thermal comfort to the touch, there are patents WO 2012/118458, A1 in which the use of mixtures of magnesium oxychloride with clays is reported and the patents WO 2013/095308, and A1 US 20080039552, A1 in which are reported additions of materials joined by organic or inorganic binders on surfaces of tiles already thermally sintered. The problem with these two proposed solutions is that the tile coatings do not have good wear resistance.

The object of the present invention is to provide ceramic coatings or coatings with a pleasant to the touch thermal sensation, similar to that of wood and good wear resistance.

A ceramic coating consists basically of a ceramic body and two layers: the engobe and enamel. The main role of the ceramic body is that of support and is constituted by a mixture of clays, kaolins and feldspars. The engobe is an intermediate layer that allows a good union between the enamel and the ceramic body and consists mainly of alkaline or alkaline earth metal aluminosilicates and zirconium silicate. Enamel is the vitreous layer that defines the functional and decorative properties on the surface of the ceramic tile and consists of alkali metal or alkaline earth metal aluminosilicates which melt at temperatures above 1000° C. to obtain the desired final finish.

The present invention comprises the incorporation of an additive or aggregate to be applied directly to one or more of the components of a ceramic coating during the elaboration of said components in the steps where ingredients are incorporated, into any known production process of ceramic coatings. and that is constituted by particles of sizes between 100 nanometers and 50 microns that remain as aggregates within a silicoaluminate matrix at firing temperatures of ceramic coatings. The aggregates are made of hard materials and high melting point that support the temperatures of industrial processing and the process of solubility of the vitreous phase during the thermal cycle of the ceramic coatings. The aggregates are compounds based on carbonate apatites. The main function of these aggregates is to reduce the thermal conductivity of the coating and consequently its thermal effusivity. In other words, they improve the thermal sensation to the touch through different mechanisms. Particles of sizes between 100 nanometers and 50 microns increase the number of grain boundaries. The particles modify the thermal anisotropy of the enamel and decrease the thermal conductivity thanks to the gas trapped within them, since the gases are the best thermal insulators.

SUMMARY OF THE INVENTION

It is a main object of the present invention to provide ceramic coatings or coatings with a pleasant to the touch thermal sensation similar to that of wood and good wear resistance.

It is another main objective of the present invention to provide an additive or aggregate to be applied directly to one or more of the components of a ceramic coating and which is constituted by particles that are kept as aggregates within a matrix of silicoaluminates at firing temperatures. of ceramic coatings.

It is a further objective to provide an additive or aggregate of the above described nature, wherein the aggregates are made up of particles of sizes between 100 nanometers and 50 microns.

It is a further object of the present invention to provide an additive or aggregate of the above described nature, wherein the aggregates are compounds based on natural carbonate apatites, synthetic carbonate apatites or mixtures thereof.

It is another object of the present invention to provide an additive or aggregate of the above described nature, wherein the main function of these aggregates is to decrease the thermal conductivity of the coating and consequently its thermal effusivity.

It is another object of the present invention to provide a method for preparing a ceramic coating having properties selected from the group comprising: low effusivity, wear resistance, resistance to chemical attack and resistance to staining, wherein the ceramic coating comprises a ceramic support body; a layer called enamel that consists of a vitreous layer that defines the functional and decorative properties of the ceramic coating; a layer called engobe which allows a good union between the enamel and the ceramic body, wherein said method comprises adding to the layer called enamel, the layer called engobe or both of 0.50% to 30% by weight of the additive or aggregate during the elaboration of said components in the ingredient incorporation steps within any known production process of ceramic coatings.

These and other objects and advantages of the present invention will become apparent to those having an ordinary skill in the art by the following detailed description of the invention.

DETAILED DESCRIPTION OF THE INVENTION

In a first aspect, the present invention relates to an additive or aggregate to be applied directly to one or more of the components of a ceramic coating during its production process, wherein said additive comprises:
 a material selected from the group comprising natural carbonate apatites, synthetic carbonate apatites, or mixtures thereof;
 wherein the carbonate apatites are in the form of particles of sizes between 100 nanometers and 50 microns.

The additive of the present invention allows the ceramic coatings to maintain their aesthetic and functional properties according to the standards used in the industry. In this way it is possible to improve the thermal comfort to the touch of the ceramic coatings and keep their technical specifications In a second aspect, the present invention relates to a ceramic coating or coating having a thermal sensation pleasant to the touch similar to that of wood and good resistance to wear.

The ceramic coating of the present invention comprises:
 a ceramic support body
 a layer called enamel that consists of a vitreous layer that defines the functional and decorative properties of the ceramic coating;
 a layer called engobe which allows a good union between the enamel and the ceramic body.
 wherein the ceramic coating is characterized in that:
 the enamel layer contains from 0.50% to 30% by weight of the additive of the present invention described above; and/or
 the engobe layer contains from 0.50% to 30% by weight of the additive of the present invention described above.
 where according to the ISO 13006 standard used in the industry, in the case of dry pressed products, the ceramic coating is classified into the following groups:
 Group $BI_a$ having a water absorption capacity between 0% and 0.5%;
 Group $BI_b$ having a water absorption capacity between 0.5% and 3.0%;
 Group $BII_a$ having a water absorption capacity between 3.0% and 6.0%;
 Group $BII_b$ having a water absorption capacity between 6.0% and 10.0%;
 Group BIII having a water absorption capacity greater than 10.0%;
 wherein the water absorption is measured in % by weight, according to ISO 10454-3.
 and wherein the ceramic coating of the present invention has the following specific properties:
 a wear resistance equal to or greater than PEI 2 according to ISO 13006 standard, essay 10545-7;
 a resistance to chemical attack equal or superior to GA, GLA and GHA standards according to ISO 13006 standard, essay 10545-13;
 a stain resistance equal to or greater than Class 3 according to ISO 13006 standard, essay 10545-14; and
 an effusivity of between 700 $Ws^{1/2}/m^2K$ y 1,000 $Ws^{1/2}/m^2K$.

The ceramic coating of the present invention has a thermal sensation to the touch similar to that of wood thanks to its low effusivity and also have good resistance to wear, resistance to chemical attack and resistance to staining.

In a third aspect, the present invention relates to a method for providing to a ceramic coating, properties selected from the group comprising: low effusivity, wear resistance, resistance to chemical attack and resistance to staining, wherein the ceramic coating comprises a ceramic body support; a layer called enamel that consists of a vitreous layer that defines the functional and decorative properties of the ceramic coating; a layer called engobe which allows a good union between the enamel and the ceramic body, wherein said method comprises adding to the layer called enamel from 0.50% to 30% by weight of the additive or aggregate during the elaboration of said components in the steps where ingredients are incorporated within any known production process of ceramic coatings.

In a fourth aspect, the present invention relates to a method for providing to a ceramic coating properties selected from the group comprising: low effusivity, wear resistance, resistance to chemical attack and resistance to staining, wherein the ceramic coating comprises a body ceramic support; a layer called enamel that consists of a vitreous layer that defines the functional and decorative properties of the ceramic coating; a layer called engobe which allows a good union between the enamel and the ceramic body, where said method comprises adding to the layer called engobe from 0.50% to 30% by weight of the additive or aggregate during the elaboration of said components in the steps where ingredients are incorporated within any known production process of ceramic coatings.

In a fifth aspect, the present invention relates to a method for providing to a ceramic coating properties selected from the group comprising: low effusivity, wear resistance, resistance to chemical attack and resistance to staining, wherein the ceramic coating comprises a body ceramic support; a layer called enamel that consists of a vitreous layer that defines the functional and decorative properties of the ceramic coating; a layer called engobe which allows a good union between the enamel and the ceramic body, wherein said method comprises adding to the layer called enamel from 0.50% to 30% by weight of the additive or aggregate; and adding to the so-called engobe layer from 0.50% to 30% by weight of the additive or aggregate during the preparation of said components in the steps of incorporating ingredients within any known production process of ceramic coatings.

The additive or aggregate object of this invention has in its structure carbonates ($CO_3$) that partially replace $PO_4^{3-}$ groups in 0.1% to 8.0% by weight. This additive, when subjected to the typical firing cycle of the ceramic coatings, it thermally reacts, releasing $CO_2$ and $O_2$, which generates a closed microporosity as a consequence of the partial decomposition of the remaining carbonate groups found in the structure of the carbonate apatites. This closed microporosity generated during the firing process is what imparts to the ceramic coatings its low thermal effusivity.

EXPERIMENTS

During the process of development of the additive and the ceramic coating of the present invention that has a low thermal effusivity, the determination of the thermal properties of the coatings that are currently marketed, was carried out using equipment acquired expressly for the measurements (C-Therm TCi Thermal Conductivity Analyzer). The equipment performs the measurement based on the principle of the "Transient Plane Source Method") which consists of analyzing the transfer of energy between a controlled heat source in a flat way and the material under study and in measuring the temperature change of the latter as a function of time.

The heat source, which in turn serves as a resistive temperature detector, is a highly sensitive thermoelectric sensor that is placed on the surface of the material whose thermal properties are to be evaluated. By applying a known and constant electrical current to the sensor, a small amount of heat is produced which will result in an increase in temperature at the interface between the sensor and the material to be measured.

The speed with which the temperature increases at the interface will depend on how quickly the heat propagates in the material being measured. Once the applied current is known and constant, the increase in temperature will in turn be reflected in a variation of the sensor potential recorded as a function of time; by means of suitable mathematical models, these data, together with the variation of temperature with time and heat flow, make it possible to calculate the thermophysical properties of the material without the need for further experimentation.

The equipment allows to determine quickly and simultaneously the thermal conductivity and thermal effusivity of materials in different state of aggregation; effusivity is precisely the property that is used to evaluate the thermal sensation to the touch of materials.

To carry out the measurement, the face of the sample whose thermal properties were to be analyzed, is placed on the sensor which is in turn mounted on a base that holds it fixed in a vertical position. A weight is placed on the sample to ensure good contact with the sensor, and between them, a small amount of a contact agent having a good thermal conductivity is added to avoid heat leaks that may alter the measurement. The conductivity and effusivity measurements were made in triplicate; the value taken in each test was also the average of 5 repetitions.

Before analyzing the samples, the proper functioning of the sensor was calibrated and checked using a standard reference material supplied by the manufacturer, with a certified value of thermal conductivity. In this case, the standard material used was Pyroceram 9606™ which is a ceramic glass developed in the 50s by the company Corning Glass Works (now Corning Inc) for NASA, and which is used thanks to its thermal properties that are reliable and extraordinarily stable.

To analyze the contribution of each component (ceramic body, engobe and enamel) to the thermal properties of the coating, the conductivity and effusivity in calcined ceramic bodies without engobe and enamel was determined, as well as in other ceramic bodies that only had the engobe, or with both engobe and enamel (finished product).

Table 1 shows the results obtained from some ceramic tiles of natural products and commercial ceramic coatings without the incorporation of carbonate apatites which were used as reference.

Table 2 shows the measurements of thermal effusivity and conductivity made to tile coatings without aggregates and with carbonate apatites aggregates according to the present invention. As shown in Table 2, in all cases it was found that the ceramic coatings with carbonate apatites aggregates showed lower values of thermal effusivity.

TABLE 1 effusivity values and thermal conductivity of some commercial ceramic coatings, natural products and synthetic products.

| KIND OF MATERIAL | EFFUSIVITY ($Ws^{½}/m^2K$) | CONDUCTIVITY k (W/mK) |
|---|---|---|
| CERAMIC COATINGS CLASSIFIED ACCORDING TO ISO 13006 STANDARD | | |
| Group BIa | 1698 | 1.467 |
| Group BIIa | 1599 | 1.289 |
| Group BIII | 1218 | 0.916 |
| NATURAL PRODUCTS | | |
| Granite | 2479 | 2.960 |
| Marble | 2055 | 2.140 |
| Wood | 684 | 0.310 |

TABLE 1-continued effusivity values and thermal conductivity of some commercial
ceramic coatings, natural products and synthetic products.

| KIND OF MATERIAL | EFFUSIVITY (Ws$^{1/2}$/m$^2$K) | CONDUCTIVITY k (W/mK) |
|---|---|---|
| SYNTHETIC PRODUCTS | | |
| Cellulosic thermoplastic floors | 948 | 0.573 |
| Vinyl floor | 622 | 0.251 |

TABLE 2

Effusivity values and thermal conductivity of some
prototypes of ceramic coatings without carbonate
apatites aggregates and with carbonate apatites
aggregates according to the present invention.

| TYPE OF MATERIAL THAT IS ADDED | EFFUSIVITY (Ws$^{1/2}$/m$^2$K) | CONDUCTIVITY k (W/mK) |
|---|---|---|
| MODIFIED ENGOBE AND STANDARD ENAMEL | | |
| Nanometric silica | 1528 | 1.177 |
| Nanometric alumina | 1567 | 1.238 |
| Refractory fiber of Al—Si—Zr | 1573 | 1.247 |
| Refractory fiber of Al—Si | 1572 | 1.245 |
| With addition of carbonate apatites | 1044 | 0.674 |
| STANDAR ENGOBE AND MODIFIED ENAMEL | | |
| Nanometric silica | 1559 | 1.223 |
| Nanometric alumina | 1564 | 1.218 |
| Refractory fiber of Al—Si—Zr | 1548 | 1.204 |
| Refractory fiber of Al—Si | 1563 | 1.230 |
| With addition of carbonate apatites | 1122 | 0.758 |
| MODIFIED ENGOBE AND ENAMEL | | |
| Refractory fiber of Al—Si—Zr | 1560 | 1.225 |
| Refractory fiber of Al—Si | 1548 | 1.207 |
| With addition of carbonate apatites | 941 | 0.565 |

As can be seen in table 2, the presence of carbonate apatites aggregates in the different types of ceramic coatings, significantly reduces the thermal conductivity and the effusivity of the ceramic coatings.

Table 3 shows effusivity and thermal conductivity values for ceramic coatings classified within Group BIa (water absorption capacity between 0% and 0.5%); which were processed at maximum firing temperatures of between 1170° C. and 1210° C. Also in Table 3 are shown values of effusiveness and thermal conductivity for ceramic coatings classified within Group BIIa (water absorption capacity between 3.0% and 6.0%), which were processed at maximum firing temperatures of between 1125 and 1170° C. In both types of coatings, carbonate apatites aggregates were added according to the present invention.

TABLE 3

Ceramic coatings classified as Group BIa that have
a water absorption capacity between 0% and 0.5%
and of Group BIIa, which have a water absorption
capacity between 3.0% and 6.0% with aggregates
of carbonate apatites according to the present invention.

| SAMPLE | EFFUSIVITY (Ws$^{1/2}$/m$^2$K) | CONDUCTIVITY k (W/mK) | PART OF THE COATING WHERE IT WAS ADDED |
|---|---|---|---|
| CERAMIC COATINGS OF GROUP BIa (water absorption capacity between 0% and 0.5%) | | | |
| Standard | 1698 | 1.467 | N/A |
| Prototype 160226-3 with carbonato apatitas | 1098 | 0.732 | ENGOBE |
| Prototype 160226-4 with carbonate apatites | 934 | 0.558 | ENGOBE + BASE |
| CERAMIC COATINGS OF GROUP BIIa (water absorption capacity between 3.0% and 6.0%). | | | |
| Standard | 1496 | 1.110 | NA |
| Prototype 150521-6 with carbonate apatites | 1141 | 0.779 | ENGOBE |
| Prototype 151104-2 with carbonate apatites | 901 | 0.520 | ENGOBE + BASE |
| Prototype 151104-3 with carbonate apatites | 852 | 0.470 | ENGOBE + BASE |

As can be seen in table 3, the presence of carbonate apatites aggregates significantly reduces the thermal conductivity and effusivity of the coatings classified according to ISO 13006 as Group BIa, which have a water absorption capacity between 0% and 0.5% and of Group BIIa, which have a water absorption capacity between 3.0% and 6.0%.

In the case of ceramic coatings classified as Group BIII having a water absorption capacity greater than 10.0%, aggregates of carbonate apatites were also added according to the present invention and were treated at maximum firing temperatures of between 1100° C. and 1140° C., obtaining values of effusivity and thermal conductivity similar to those of ceramic coatings classified Group BIIa, which have a water absorption capacity between 3.0% and 6.0% within the same ISO 13006 standard.

One of the most used international standards is ISO 13006; specifically, to evaluate the wear of ceramic coatings the most used method is the PEI (Porcelain Enamel Institute); by which and according to ISO 10545-7 the abrasion resistance of the enameled surface is determined.

The resistance to stains is determined according to the standard ISO 10545-14 and the chemical resistance is determined according to the standard ISO 10545-13. Table 4 shows the results of these two tests performed on ceramic coatings prepared with carbonate apatites aggregates according to the present invention.

TABLE 4

Test results according to ISO-10545 (resistance to abrasion, resistance to stains and resistance to chemicals) practiced to commercial coatings (standard) and to coatings with carbonate apatites aggregates according to the present invention.

| | Standard | Prototype 151104-3 with carbonate apatites |
|---|---|---|
| RESISTANCE TO ABRASION OF THE SURFACE (ESSAY ISO 10545-7) | | |
| Resistance PEI | IV | IV |
| RESISTANCE TO STAINS (ESSAY ISO 10545-14) | | |
| Iodine in alcohol | Class 5 | Class 5 |
| GreenishAgent (Cr2O3) | Class 5 | Class 5 |
| Aceite de oliva | Class 5 | Class 5 |
| Azul de metileno 1% | Class 5 | Class 5 |
| RESISTANCE TO CHEMICAL PRODUCTS (ESSAY ISO 10545-13) | | |
| Sodium hypochlorite | GA | GA |
| Ammonium Chloride 100 g/l | GA | GA |
| Citric acid100 g/l | GLA | GLA |
| HCl 3% | GLA | GLA |
| HCl 18% | GHA | GHA |
| KOH 30 g/l | GLA | GLA |
| KOH 100 g/l | GHA | GHA |
| Lactic Acid5 % | GHA | GHA |

Classification for Spotting Agents
  Class 1=The stain is not removed by any means
  Class 2=The stain is removed with appropriate solvent of strong activity during 24 h.
  Class 3=The stain is removed by mechanical means (rotating brush) and strong cleaning agent.
  Class 4=The stain is removed with a weak activity cleaning agent (common soap)
  Class 5=The stain is removed with running water.
Classification for Salt Solutions for Pool
  GA=No visible effect
  GB=Clear appearance modification.
  GC=Visible effect on cut sides, uncut sides and on the surface.
Classification for Weak Solutions of Acids and Bases
  GLA=No visible effect
  GLB=Clear appearance modification.
  GLC=Visible effect on cut sides, uncut sides and on the surface.
Classification for Strong Solutions of Acids and Bases
  GHA=No visible effect
  GHB=Clear aspect modification.
  GHC=Visible effect on cut sides, uncut sides and on the surface.
PEI Classification for Enameled Ceramic Tiles

| Visible effect at # of revolutions | Class |
|---|---|
| 100 | 0 |
| 150 | I |
| 600 | II |
| 750, 1500 | III |
| 2100, 6000, 12000 | IV |
| GREATER THAN 12001 | V |

Finally it must be understood, that the additive and the ceramic coating of the present invention is not limited to the described and illustrated practices, and that persons having ordinary skill in the art can, with the teachings provided by the invention, suggest modifications to the ceramic coating and method of the present invention.

The invention claimed is:

1. A ceramic coating comprising a ceramic support body and the following layers: a layer called enamel comprising a glass layer; and a layer called engobe which allows union between the enamel and the ceramic support body, wherein the ceramic coating is characterized by at least one of its layers containing from 0.50% to 30% by weight of an additive comprising carbonate apatites which have in its structure carbonates ($CO_3$) that partially replace groups $PO_4^{3-}$ in a 0.1% to 8.0% by weight; wherein carbonate apatites are selected from one or more materials of the group consisting of: natural carbonate apatites, synthetic carbonate apatites, or mixtures thereof and wherein the carbonate apatites are in the form of particles comprising diameters between 100 nanometers and 50 microns.

* * * * *